United States Patent
Pfemeter

(10) Patent No.: US 6,355,098 B1
(45) Date of Patent: Mar. 12, 2002

(54) LIGHT-WEIGHT MATERIAL CONTAINING BLOWN PERLITE AND METHODS OF PRODUCING THE SAME

(75) Inventor: Alfred Pfemeter, Bad Krozingen (DE)

(73) Assignee: Marmorit GmbH, Bollschweil (DE)

( * ) Notice: Subject to any disclaimer, the term of this patent is extended or adjusted under 35 U.S.C. 154(b) by 0 days.

(21) Appl. No.: 09/341,679

(22) PCT Filed: Jan. 13, 1998

(86) PCT No.: PCT/EP89/00149

§ 371 Date: Sep. 13, 1999

§ 102(e) Date: Sep. 13, 1999

(87) PCT Pub. No.: WO98/32713

PCT Pub. Date: Jul. 30, 1998

(30) Foreign Application Priority Data

Jan. 25, 1997 (DE) .......................................... 197 02 699

(51) Int. Cl.⁷ .............................................. C04B 14/18
(52) U.S. Cl. ....................... 106/602; 106/603; 106/605; 106/DIG. 2; 264/417; 264/432
(58) Field of Search ................................ 106/602, 603, 106/DIG. 2, 605; 264/417, 432

(56) References Cited

U.S. PATENT DOCUMENTS 4,462,835 A  7/1984  Car

FOREIGN PATENT DOCUMENTS

| DE | 2813745 A1 | 10/1978 |
| DE | 3921278 A1 | 1/1990 |
| DE | 4438627 C1 | 5/1996 |
| EP | 0048570 A1 | 3/1982 |
| SU | 351804 | * 9/1972 |
| SU | 1038328 | * 8/1983 |
| SU | 93218464/27 | 1/1990 |

OTHER PUBLICATIONS

Khainer, et al., "Heat–insulating articles," *Chemical Ahstracts*, 91(14):237 (1979).

Elkhova, et al., "Raw material mixture for producing sheet construction materials," *Chemical Abstracts*, 106(10):321 (1987).

* cited by examiner

*Primary Examiner*—Paul Marcantoni
(74) *Attorney, Agent, or Firm*—Jacobson Holman, PLLC

(57) ABSTRACT

The present light-weight material contains expanded perlite, alkali silicates and optionally added hardeners for aqueous alkali silicates, wherein said expanded perlite has a grain of from 0.8 to 6 mm, a hydrophobizing agent is present, the bulk densities are in the range of from 60 to 500 kg/m³.

9 Claims, No Drawings

LIGHT-WEIGHT MATERIAL CONTAINING BLOWN PERLITE AND METHODS OF PRODUCING THE SAME

The present invention relates to a light-weight material containing expanded perlite, alkali silicates, optionally added hardeners for aqueous alkali silicates, and processes for producing same.

Light-weight materials containing expanded perlite are the subject matter of Applicant's WO 96/04217. They are prepared by activating silicate light-weight aggregates, such as perlite, by an alkaline earth hydroxide and a little water, followed by hydrothermal treatment with steam to bond the particles to one another.

This method is -time-consuming, and also relatively energy-consuming because of the hydrothermal treatment. Thus, there is a need for a more rapid, more simple and less energy-consuming process for the preparation of a light-weight material.

From DE-A-28 13 745, a flexurally rigid solid composite material is known which is obtained by heating from 20 to 50 parts by weight of expanded perlite in the form of a finely milled powder with from 9.5 to 19 parts by weight of sodium silicate or potassium silicate, from 2 to 9 parts by weight of zinc oxide, and from 21.5 to 67 parts by weight of water, including the water content of the silicate. The mixture preferably also comprises a solidifying agent, such as sodium fluorosilicate. The material is preferably shaped in the form of half shells with grooves and tongues, being thus suitable for the heat insulation of pipings. As an advantage of this material, it is stated having a smooth, aesthetically appealing surface and a high resistance to oil and hot water. The admixed material, after an interim storage of up to 2.5 hours, is heated, wherein microwave energy may also be used in addition to slow heating from outside. It is prepared by casting into molds, followed by pressing in a hydraulic press. The hardening may also be effected by the pressing in of carbon dioxide rather than using sodium fluorosilicate.

A further development of this material is described in EP-A-0 048 570, the flexural strength being increased by the addition of phosphates or clays.

From the Derwent referate 93-218464/27, a heat-insulating product is known which consists of a mixture of expanded perlite and water glass as well as a hydrophobizing agent; it is treated with carbon dioxide for hardening. The product contains 60% by weight of expanded perlite and 40% by weight of water glass, and an organosilicate hydrophobizing agent. The compacting factor is 2.5, corresponding to a volume reduction to 40%. The compressed system must be gassed with $CO_2$, followed by drying at ambient temperature with circulating air for 24 to 48 hours. This is followed by hardening at 300 to 450° C. in several cycles in a $CO_2$ atmosphere.

From DE-C-44 38 627, an insulating and levelling composition is known which is constituted of 70% by volume of expanded perlite and 30% by volume of light-weight granules, such as pumice or light-weight concrete. This blend is mixed using a forced-circulation mixer and alkali water glass. The resulting product is packed in sacks and employed at the building site where it is compacted by 20 to 30% and hardened in the air. This material has a poor mechanical strength. Another drawback of this material is the fact that it often quickly hardens within the sack already upon application of mechanical pressure.

It has been the object of the present invention to provide a fiber-free inorganic non-combustible water-repellent light-weight material based on expanded perlite, alkali silicates and optionally added hardeners for aqueous alkali silicates, which material is easily and simply prepared, does not require any toxic chemicals and can be processed simply into sheets, molded parts or blocks suitable for heat insulation, especially of walls and buildings.

This object has now been achieved by using expanded perlite having a grain size of from 0.8 to 6 mm in the presence of a hydrophobizing agent, wherein bulk densities in the range of from 60 to 500 kg/m³ are achieved. The content of expanded perlite is preferably increased to at least 50 mass percent. In contrast to the prior art, the expanded perlite is not milled to a powder having a maximum grain size of 0.3 mm, but it is possibly used in an intact condition with a grain size of from 0.8 to 6 mm, preferably with a grain size in the range of from 0.8 to 3.5 mm.

Sodium water glass with a weight modulus of from 2.0 to 4.0, preferably from 2.5 to 3.7, or a potassium water glass with a weight modulus of from 1.0 to 3.0, preferably from 1.8 to 2.7, are preferably used as the alkali silicates. Mixtures of different sodium and potassium water glasses may also be used.

It is essential to the invention that the alkali silicates used as binders contain a hydrophobizing agent. In particular, alkyl siliconates have proven useful as said hydrophobizing agents. In principle, however, other typical hydrophobizing agents may also be used, provided they are soluble in the water glass and alkali-resistant and thus result in a water-repellent bulk hydrophobization with a w value of less than $0.5 \text{ kg/m}^2\text{h}^{0.5}$.

Conventional liquid or solid hardeners may be used as the hardener for aqueous alkali silicates. Typical suitable hardeners ers include zinc, aluminum, aluminate and silicate containing preparations, ferrosilicon or aluminum phosphates. They may be admixed with the aqueous alkali silicate either in dissolved or in suspended form, or sprayed later onto the free-flowing product. Further, the perlite may be either first sprayed with up to 20% by weight of water and then mixed with an insoluble hardener before the mixture of aqueous alkali silicates and hydrophobizing agent is applied, or else the perlite is sprayed with the dissolved or suspended hardener before it is mixed with the mixture of aqueous alkali silicates and hydrophobizing agent. Finally, the free-flowing product may also be admixed with a dry powdery hardener.

The amounts of the aqueous alkali silicate and added hydrophobizing agent and optionally the hardeners are only so large, on principle, that the perlite still remains a free-flowing bulk material. Higher amounts of aqueous alkali silicates and additional water, which result in a clotting or aggregation of the perlite or even castability of the mixture, are to be avoided. Such materials are not or but difficult to handle, and can hardly be filled in molds, or they contain an unnecessarily high amount of water. Removal of the latter consumes more energy and is therefore undesirable.

To increase the tensile strength, the light-weight material according to the invention may be provided with high-tensile strength cover layers on one or more surfaces thereof. There may be used, in particular, fiber glass fabrics, fiber glass webs, fiber glass strips, mats or strips of all kinds, such as metal foils, which may also be perforated, as well as metal gauzes or metal strips, all of which may be open to water vapor diffusion or water-vapor impermeable, but always have a high tensile strength. They are applied either already in the preparation of the molded light-weight materials by covering the bottom and/or the side walls of the molds with the high-tensile strength materials prior to filling them with the free-flowing bulk material, said materials having previously been brushed, soaked or sprayed with a binder, preferably aqueous alkali silicates. If desired, such a layer may also be placed on top after filling the molds, prior to the mold's being optionally slightly compressed and then heated. It is altogether possible as well to adhere such high-tensile strength layers later to surfaces left uncovered in the first production step. However, this usually requires a second heating step.

The process for producing the light-weight material according to the invention is generally performed in such a way that the expanded perlites having a grain size of from 0.8 to 6 mm are mixed with a mixture of aqueous alkali silicates and the hydrophobizing agent and optionally soluble or suspended hardeners to give still free-flowing products, the mixture is filled in molds, optionally slightly compressed and then heated.

If hardeners for aqueous alkali silicates are to be employed, they are preferably sprayed onto the free-flowing product as a solution or suspension. However, it is also possible to add such hardeners directly to the mixture of aqueous alkali silicate and hydrophobizing agent, unless this will result in too quick a reaction with the alkali silicates. Especially insoluble hardeners are preferably adhered to wetted perlite, which is previously wetted with up to 20% by weight of water, based on the weight of the perlite. This wetted perlite is then mixed with a mixture of aqueous alkali silicate and hydrophobizing agent.

The heating of the filled and optionally slightly compressed molds is effected by microwaves since this results in a particularly uniform heating of the inner regions as well. In addition, it has been found that heating by microwaves yields a strength which is by up to 400% higher than when heated in an oven.

After filling the material in molds, the final volume is preferably reduced by gently pressing or compressing the mold. Depending on the selected charged weight and the selected final volume, the bulk density of the light-weight material may also be influenced in this way. Too hard pressing results in bulk densities higher than 500 kg/m$^3$.

If the shaping is supported by pressing, the molded parts may be demolded prior to heating and conveyed through the microwave plant in this form. It may be convenient to leave the molded part on a microwave-transparent bottom plate which is conveyed along through the passage plant or belt plant. When belt plants are employed, the molded part is dried by moving to and fro through the microwave zone.

In addition to the bottom side and top side of the molded part, if desired, its side edges may also be lined with a high-tensile strength material, after having been brushed, soaked or sprayed with a binder, such as aqueous alkali silicate.

One great advantage of the light-weight materials according to the invention is the fact that the heating mainly serves to firmly bond the perlite grains together, but it is not necessary to remove major quantities of water by evaporation. The latter is a very substantial cost factor and also contributes to a rather energy-saving production of the material.

The light-weight materials according to the invention generally consist of from 50 to 500 mass parts of expanded perlite, 100 mass parts of aqueous alkali silicate, and from 2.0 to 18.5 mass parts of hydrophobizing agent. If hardeners are added, this is done in amounts of from 0 to 100 mass parts.

The light-weight material according to the invention has very high adhesive, tensile, tensile-in-bending and compressive strengths and a good heat insulation, as related to its bulk density. It contains little or no combustible materials and only contains safe components, in terms of health hazards. The light-weight material may be open to water vapor diffusion. However, if desired, it may also be provided with water-vapor impermeable outer layers. Its open-pore structure results in a good acoustic absorption. The bulk hydrophobization results in overall hydrophobic properties, also at fractures and cutting edges.

The light-weight material according to the invention and the process of its preparation are further illustrated in the following Examples:

EXAMPLE 1

173.4 weight parts of expanded perlite having a grain size of between 1.4 and 2.2 mm is mixed with 103.5 weight parts of a mixture of 100 weight parts of sodium water glass (modulus 3.3) and 3.5 weight parts of a hydrophobizing agent (alkyl siliconate) to give a free-flowing bulk material. This material is filled in molds, slightly pressed and heated using microwaves to obtain a product having a bulk density of 115 kg/m$^3$ and a tensile strength in adhesion of 132 kN/m$^2$.

EXAMPLE 2

In a manner analogous to that described in Example 1, 147.8 weight parts of an expanded perlite having a grain size of between 2.2 and 2.7 mm is processed with 103.5 weight parts of the same mixture of sodium water glass and hydrophobizing agent to give a free-flowing bulk material. Molding, slightly pressing and heating using microwaves yields a product having a bulk density of 101 kg/m$^3$ and a tensile strength in adhesion of 134 kN/m$^2$.

EXAMPLE 3

The same product as in Example 2 was dried in a drying oven rather than treated with microwaves. The tensile strength in adhesion was only 33 kN/m$^2$.

EXAMPLE 4

167.2 weight parts of an expanded perlite having a grain size of between 1.4 and 2.2 mm is mixed with 103.5 weight parts of a mixture of 100 weight parts of potassium water glass (modulus 2.2) and 3.5 weight parts of a hydrophobizing agent to give a free-flowing bulk material. Molding and heating using microwaves yields a product having a bulk density of 107 kg/m$^3$ and a tensile strength in adhesion of 111 kN/m$^2$.

EXAMPLE 5

In the same way as described in Example 4, 175 weight parts of expanded perlite is processed with 103.5 weight parts of a mixture of water glass and hydrophobizing agent to give a free-flowing bulk material. The water glass used is a mixture of 70 weight parts of sodium water glass (modulus 3.3) and 30 weight parts of potassium water glass (modulus 2.2). The final product has a bulk density of 113 kg/m$^3$ and a tensile strength in adhesion of 122 kN/m$^2$.

What is claimed is:

1. A process for producing a light-weight material containing expanded perlites, alkali silicates and optionally added hardeners for aqueous alkali silicates, characterized in that expanded perlites having a grain size of from 0.8 to 6 mm are mixed with a mixture of aqueous alkali silicates and hydrophobizing agents and optionally soluble or suspensible hardeners, to give a free-flowing product having a content of at least 50 mass % perlite, which is filled in a mold, optionally compressed, and then heated using microwaves.

2. The process according to claim 1, characterized in that said grain size is from 0.8 to 3.5 mm.

3. The process according to claim 1, characterized in that said hardeners in the form of a solution or suspension are sprayed onto said free-flowing product.

4. The process according to claim 1, characterized in that said perlite is first sprayed with up to 20% by weight of water and then mixed with an insoluble hardener before the mixture of aqueous alkali silicates and hydrophobizing agent is applied.

5. The process according to any of claim 1, characterized in that the bottom and/or the side walls of the molds are covered with high-tensile strength materials which have previously been brushed, soaked or sprayed with a binder and, optionally, the filled mold is also covered with such materials, prior to optionally compressing the filled mold and then heating it using microwaves.

6. The process of claim 5 wherein the binder is an aqueous alkali silicate.

7. The process according to any of claim 1, characterized in that high-tensile strength layers are adhered to surfaces left uncovered in the first production step, followed by another heating step.

8. The process according to any of claim 1, characterized in that some or all surfaces are later covered with an alkali-resistant material which is open to water vapor diffusion or water-vapor impermeable.

9. The process according to any of claim 1, characterized in that the free-flowing products have a bulk density of 60–500 kg/m$^3$.

* * * * *